United States Patent
Hofmann et al.

(10) Patent No.: US 10,794,747 B2
(45) Date of Patent: Oct. 6, 2020

(54) FLEET MANAGEMENT EFFICIENCY VISUALIZATION

(71) Applicant: FORD MOTOR COMPANY, Dearborn, MI (US)

(72) Inventors: Brian Hofmann, Wixom, MI (US); John William Schmotzer, Canton, MI (US); Richard Gordon, Canton, MI (US); Darcy Salman, Beverly Hills, MI (US)

(73) Assignee: Ford Motor Company, Dearborn, MI (US)

( * ) Notice: Subject to any disclaimer, the term of this patent is extended or adjusted under 35 U.S.C. 154(b) by 329 days.

(21) Appl. No.: 15/793,493

(22) Filed: Oct. 25, 2017

(65) Prior Publication Data

US 2019/0120676 A1     Apr. 25, 2019

(51) Int. Cl.
| | |
|---|---|
| *B60R 16/023* | (2006.01) |
| *G01F 9/00* | (2006.01) |
| *G01F 15/06* | (2006.01) |
| *G06Q 50/30* | (2012.01) |
| *G06T 11/20* | (2006.01) |

(52) U.S. Cl.
CPC ............ *G01F 9/008* (2013.01); *G01F 15/068* (2013.01); *G06Q 50/30* (2013.01); *G06T 11/206* (2013.01)

(58) Field of Classification Search
CPC ...... G01F 9/008; G01F 15/068; G06T 11/206; G06Q 50/30
See application file for complete search history.

(56) References Cited

U.S. PATENT DOCUMENTS

| | | | | |
|---|---|---|---|---|
| 5,411,002 | A | * | 5/1995 | Smitley ............... F02D 41/3082 123/357 |
| 5,505,076 | A | * | 4/1996 | Parkman ................. G01F 9/008 73/114.52 |
| 6,098,012 | A | * | 8/2000 | Stander .................... F02D 37/02 123/406.47 |
| 8,805,639 | B1 | * | 8/2014 | Musicant ................. G07C 5/08 702/127 |
| 9,563,893 | B2 | * | 2/2017 | Lamb .................. G06Q 20/4016 |
| 9,587,579 | B2 | * | 3/2017 | Ulrey ................... F02D 41/3082 |
| 10,056,008 | B1 | * | 8/2018 | Sweany ............... G09B 19/167 |
| 2002/0100801 | A1 | * | 8/2002 | Na-Ranong ........... G07F 13/025 235/381 |

(Continued)

*Primary Examiner* — Khoi H Tran
*Assistant Examiner* — Jorge O Peche
(74) *Attorney, Agent, or Firm* — Michael J. Spenner; Brooks Kushman P.C.

(57) ABSTRACT

A powertrain controller of a vehicle provides a fuel pump actuator signal indicative of fuel flow to a vehicle bus. A processor is configured to receive data from the vehicle bus. The processor performs an integration of the actuator signal to accumulate fuel usage of the vehicle, and periodically sends the accumulated fuel usage, vehicle speed, engine speed, engine status, and vehicle location to a remote server. A subset of accumulated fuel usage is retrieved for a set of the vehicles of a fleet traversing a route during a timeframe, the accumulated fuel usage compiled from fuel pump actuator signals. Fuel waste is computed for identified idle time periods within the accumulated fuel usage. Monetary waste is computed from the fuel waste. A report is generated including the monetary waste.

18 Claims, 6 Drawing Sheets

(56) References Cited

U.S. PATENT DOCUMENTS

| | | | | |
|---|---|---|---|---|
| 2003/0130965 A1* | 7/2003 | Jacobs | | G07F 13/025 |
| | | | | 705/412 |
| 2004/0139946 A1* | 7/2004 | Hamada | | F02M 37/20 |
| | | | | 123/458 |
| 2005/0060070 A1* | 3/2005 | Kapolka | | G07C 5/008 |
| | | | | 701/31.4 |
| 2005/0113993 A1* | 5/2005 | Son | | F01M 11/10 |
| | | | | 701/29.5 |
| 2007/0282520 A1* | 12/2007 | Cradick | | B60W 20/00 |
| | | | | 701/123 |
| 2008/0107940 A1* | 5/2008 | Ju | | H01M 8/04194 |
| | | | | 429/414 |
| 2008/0189033 A1* | 8/2008 | Geelen | | G01C 21/3697 |
| | | | | 701/533 |
| 2009/0109022 A1* | 4/2009 | Gangopadhyay | | G01C 21/3679 |
| | | | | 340/540 |
| 2010/0059020 A1* | 3/2010 | Serai | | F02D 19/061 |
| | | | | 123/458 |
| 2010/0106352 A1* | 4/2010 | Skaff | | B60K 6/445 |
| | | | | 701/22 |
| 2011/0246004 A1* | 10/2011 | Mineta | | B60W 20/11 |
| | | | | 701/22 |
| 2013/0245880 A1* | 9/2013 | McQuade | | G07C 5/008 |
| | | | | 701/32.4 |
| 2016/0252381 A1* | 9/2016 | Kwak | | G07C 5/008 |
| | | | | 701/123 |
| 2016/0253924 A1* | 9/2016 | Kwak | | G09B 19/167 |
| | | | | 701/123 |
| 2016/0290265 A1* | 10/2016 | Gabriel | | F02D 41/021 |
| 2017/0320498 A1* | 11/2017 | Miller | | B60W 10/101 |
| 2017/0337618 A1* | 11/2017 | Berkooz | | G01C 21/34 |
| 2018/0091930 A1* | 3/2018 | Jefferies | | G07C 9/00571 |
| 2019/0228600 A1* | 7/2019 | Takeuchi | | G07C 5/085 |
| 2019/0293016 A1* | 9/2019 | Fulton | | B60W 50/14 |

* cited by examiner

FLEET MANAGEMENT EFFICIENCY VISUALIZATION

TECHNICAL FIELD

Aspects of the disclosure generally relate to visualization of vehicle efficiency for fleet management.

BACKGROUND

Hybrid-electric drivetrains, vehicle aerodynamics, weight budgets, and low rolling-resistance tires have contributed to an increase in overall vehicle fuel efficiency. Despite these technological advances, driving habits continue to contribute to the amount of fuel consumed by a vehicle. For instance, over-speeding, rapid acceleration, rapid braking, and excessive idling spend additional fuel than would otherwise be required. Because fuel efficiency is a priority in the purchase and management of vehicles, technological advances and improvements in driver habits are factors to consider in improving the fuel efficiency of a vehicle fleet.

SUMMARY

In one or more illustrative embodiments, a system includes a powertrain controller of a vehicle configured to provide a fuel pump actuator signal indicative of fuel flow to a vehicle bus; and a processor configured to receive data from the vehicle bus, programmed to perform an integration of the actuator signal to accumulate fuel usage of the vehicle, and periodically send the accumulated fuel usage, vehicle speed, engine speed, engine status, and vehicle location to a remote server.

In one or more illustrative embodiments, a system includes a memory storing accumulated fuel usage for vehicles of a fleet compiled from fuel pump actuator signals; and a processor of a server programmed to retrieve a subset of accumulated fuel usage for a set of the vehicles traversing a route during a timeframe, compute fuel waste for identified idle time periods within the accumulated fuel usage, compute monetary waste from the fuel waste, and generate a report including the monetary waste.

In one or more illustrative embodiments, a method includes retrieving a subset of accumulated fuel usage for a set of the vehicles of a fleet traversing a route during a timeframe, the accumulated fuel usage compiled from fuel pump actuator signals computing fuel waste for identified idle time periods within the accumulated fuel usage; computing monetary waste from the fuel waste; and generating a report including the monetary waste.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
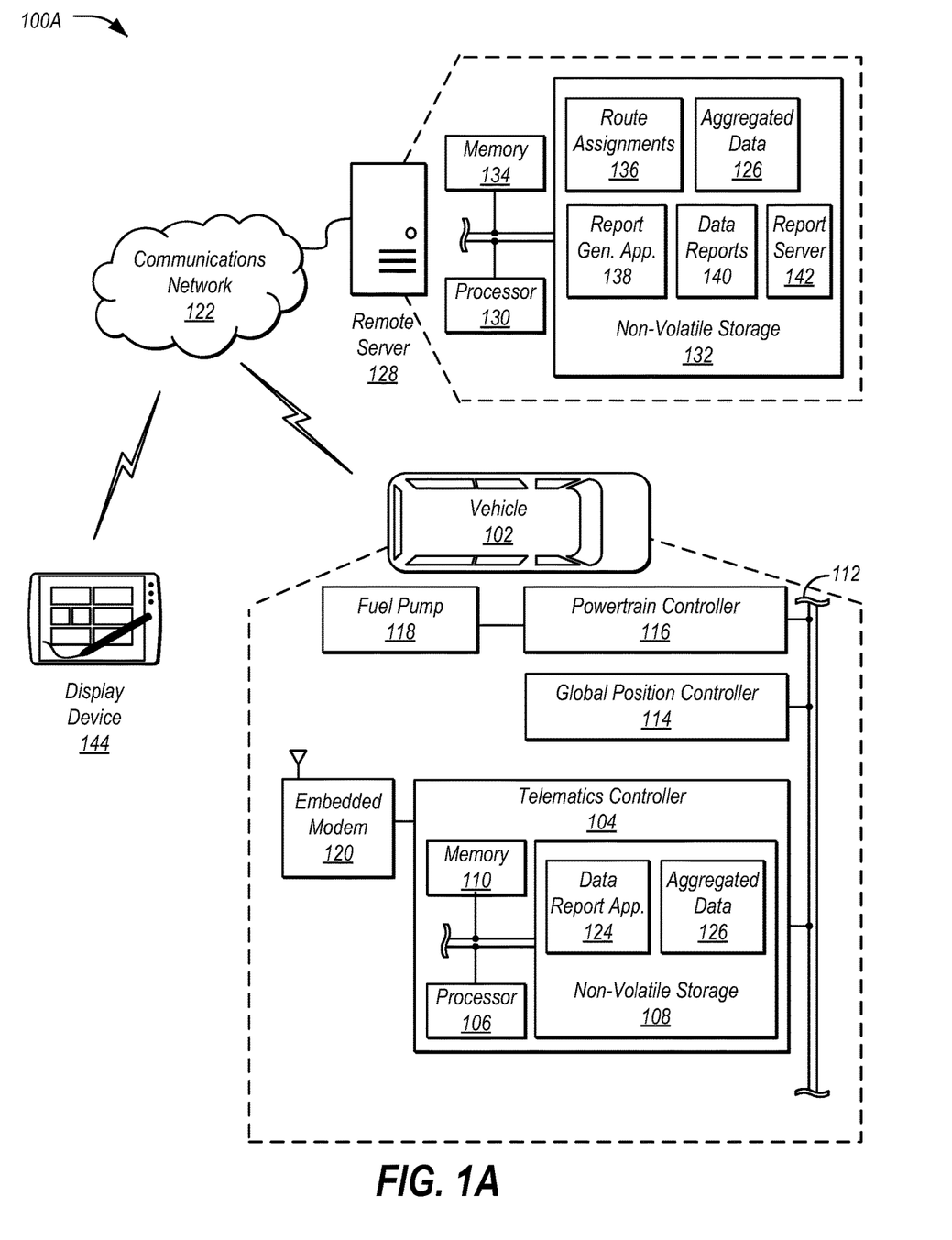
FIG. 1A illustrates an example system for monitoring vehicle fuel usage over predefined routes to identify fuel waste cost.

FIG. 1A illustrates an example system 100A for monitoring vehicle 102 fuel usage over predefined routes to identify fuel waste cost. As shown, the system includes one or more vehicles 102 of a fleet in communication over a communications network 122 with a remote server 128. The remote server 128 receives aggregated data 126 from each of the vehicles 102. The remote server 128 also performs analytics on the aggregated data 126 to generate data reports 140. The aggregated data 126 includes precise fuel usage information from the vehicles 102 compiled from fuel pump 118 data made available by the powertrain controller 116, as well as other information such as vehicle speed, engine speed, engine on/off status, and/or vehicle location. The data reports 140 include an accumulation of data for various routes according to stored route assignments 152 for the vehicles 102. The data reports 140 also rank the drivers of the vehicles 102 based on performance against waste averages for the routes. Using the data, the system 100 can identify wasteful driver behavior, such as excessive idling. Thus, the system 100 can provide information regarding how drivers are performing when measured against other drivers having the same route pattern. The data reports 140 may be accessed by a display device 144 to allow an operator of the device to understand behaviors that should change, as well as provide insight to fleet managers regarding the cost of the identified wasteful behavior. Further aspects of the system 100 are discussed in detail below.

The vehicles 102 of the system 100 may include a fleet of vans. In other examples, the vehicles 102 may include various other types of passenger vehicles, such as sedans, crossover utility vehicles (CUVs), sport utility vehicles (SUVs), trucks, recreational vehicles (RVs), or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

A telematics controller 104 of the vehicle 102 may be configured to provide telematics services to the vehicle 102.

These services may include, as some non-limiting possibilities, navigation, turn-by-turn directions, vehicle health reports, local business search, accident reporting, and hands-free calling. The telematics controller 104 may include one or more processors 106 configured to perform instructions, commands, and other routines in support of the processes described herein. Such instructions, and other data, may be maintained in a non-volatile manner using a variety of types of computer-readable storage medium 108. The data may be loaded from the storage medium 108 into a memory 110 to be accessed by the processor 106. The computer-readable storage medium 108 (also referred to as a processor-readable medium or storage) includes any non-transitory medium (e.g., a tangible medium) that participates in providing instructions or other data that may be read by the processor 106 of the telematics controller 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The vehicle bus 112 may include various methods of communication available between the telematics controller 104 and other components of the vehicle 102. For instance, the vehicle bus 112 may include one or more of a vehicle controller area network (CAN), an Ethernet network, or a media oriented system transfer (MOST) network, as some examples. The vehicle 102 may include various vehicle controllers that communicate via the vehicle bus 112. These controllers may include, as shown, a global position controller 114 and a powertrain controller 116. As some other examples, the controllers may include a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.). The controllers that are shown are represented as discrete modules and systems. However, the controllers may share physical hardware, firmware, and/or software, such that the functionality from multiple controllers may be integrated into a single controller, and that the functionality of various such controllers may be distributed across a plurality of controllers.

The global position controller 114 may be configured to provide current vehicle 102 location and heading information to the vehicle bus 112. This information may allow various vehicle 102 features to understand the current physical location and heading of the vehicle 102.

The powertrain controller 116 may be configured to provide control of components related to the vehicle drivetrain. These engine operating components may include, as some examples, idle control components, fuel delivery components, and emissions control components. The powertrain controller 116 may further provide for monitoring of engine operating components, such as providing information regarding engine status, engine diagnostic codes, engine RPM, engine fuel usage, and engine torque, as some possibilities. The powertrain controller 116 may provide the information to the vehicle bus 112.

The fuel pump 118 may be configured to provide fuel flow to the engine, and may be one of the components controlled via the powertrain controller 116. An actuator of the fuel pump 118 may be driven by a pulse-width modulated (PWM) signal generated by the powertrain controller 116. The powertrain controller 116 may adjust the PWM signal based on a litany of factors, but particularly by throttle control.

To allow for monitoring of fuel usage, the powertrain controller 116 may provide the PWM signal or information indicative of the PWM signal to the vehicle bus 112. As the fuel information provided to the vehicle bus 112 is based on the actual signal controlling the fuel pump 118, the amount of fuel used can be measured with a low error tolerance (in some cases on the order of ~1%). This measure of fuel consumption is more accurate than estimates of fuel use estimated from airflow, throttle position, and dataset mappings.

The telematics controller 104 may communicate with an embedded modem 120 to facilitate communication by the vehicle 102 over a communications network 122. The communications network 122 may provide communications services, such as packet-switched network services (e.g., Internet access, voice over Internet Protocol (VoIP) communication services), to devices connected to the communications network 122. An example of a communications network 122 is a cellular telephone network. For instance, the embedded modem 120 may access the cellular network via connection to one or more cellular towers. To facilitate the communications over the communications network 122, the embedded modem 120 may be associated with unique device identifiers (e.g., mobile device numbers (MDNs), Internet protocol (IP) addresses, etc.) to identify the communications of the embedded modem 120 on the communications network as being associated with the vehicle 102. To support the telematics services, the telematics controller 104 may utilize the embedded modem 120 to facilitate networked communication between the vehicle 102 and devices external to the vehicle 102.

The data report application 124 may be an application installed to the storage medium 108 of the telematics controller 104. When executed by the telematics controller 104, the data report application 124 may include instructions that cause the telematics controller 104 to monitor the status of the vehicle 102 (e.g., whether the engine is on or off) as well as monitor fuel flow rate of the engine to determine how fuel is flowing. Engine status may be determined based on status information provided by the powertrain controller 116 over the vehicle bus 112. Fuel flow may be determined based on the PWM signal published by the powertrain controller 116 over the vehicle bus 112.

The data report application 124 may further include instructions to cause the telematics controller 104 to generate aggregated data 126 based on the received data. The aggregated data 126 may include the amount of fuel that was used, (e.g., according to an integration of the received PWM data). The aggregated data 126 may also include other information captured from the vehicle bus 112, such as vehicle speed, engine speed, engine on/off status, vehicle identifier (e.g., VIN), and/or vehicle location (e.g., provided from the global position controller 114).

The data report application 124 may offer two transmission mechanisms for providing the aggregated data 126: a periodic transmission of fuel used since the last reset of the telematics controller 104, and a transmission of a trip summary. The trip summary includes the fuel consumed for the current trip. Both transmissions may be provided as configurable parameters to reduce the potential for packet loss over the communication network 122. For instance, a vehicle 102 may have cellular coverage the whole way throughout a route. However, in other cases, a route may traverse a tunnel or other area in which connectivity is unavailable or unreliable. Thus, by sending an aggregated accumulation of the fuel used, the total fuel used may be recreated by the recipient, regardless of whether one or more transmissions along the route were lost.

The remote server 128 may include computing hardware configured to provide data processing and reporting services for the vehicles 102 of the fleet. The remote server 128 may include various types of computing apparatus, such as a computer workstation, a server, a desktop computer, a virtual server instance executed by a mainframe server, or some other computing system and/or device. Similar to the telematics controller 104, the remote server 128 generally includes a storage 132 on which computer-executable instructions and data may be maintained, where the instructions may be executable by one or more processors 130 and the data and instructions may be loaded into memory 134. The remote server 128 may be configured to store various data, such as the aggregated data 126 received from the vehicles 102.

The remote server 128 may be further configured to store route assignments 136 for the vehicles 102. For example, the vehicles 102 of the fleet may be driven down predefined routes that may each be assigned a route identifier. When a vehicle 102 is assigned to drive a specific route, an entry may be added to the route assignments 136 to specify which route. This entry may include, for instance, an identifier of the user (e.g., a unique identifier of the user), an identifier of the vehicle (e.g., a VIN, or other identifier of the vehicle 102), an identifier of the route, and a time at which the vehicle 102 is intended to drive the route.

The report generator application 138 may be an application included on the storage 132 of the remote server 128. Generally, the report generator application 138 may include instructions that, when loaded into memory and executed by the remote server 128, cause the remote server 128 to generate data reports 140 in view of the aggregated data 126 received from the vehicles 102 and route assignments 136 for the vehicles 102.

For instance, the report generator application 138 may receive a request for a report that includes a selection of a route (e.g., one of the routes identified in the route assignments 136) and may retrieve from the storage 132 aggregated data 126 corresponding to vehicle 102 traversals of that route during a period of time. The period of time may be specified in the request for the report, or may default to a predefined period of time such as the last day, week, month, or all time. The vehicles 102 to include in the route dataset may be identified based on a query of the route assignments 136 for vehicles 102 that traversed the selected route during the indicated period of time. Thus, the report generator application 138 may query the stored data to retrieve aggregated data 126 for the vehicles 102 and timeframe of the requested route report.

Using the selected data, the report generator application 138 may compute an average fuel usage for vehicles 102 traversing the route. In an example, this may be a simple average of the total fuel consumed by all vehicle 102 divided by the total number of vehicles 102. The report generator application 138 may also compute an efficiency score (e.g., miles per gallon, gallons per liter, etc.) based on the fuel used and the total distance driven by the corresponding vehicle 102.

Moreover, the report generator application 138 may determine an amount of waste for each vehicle 102. For instance, this amount of waste may include an amount of fuel wasted during idle time for the vehicle 102. To determine the amount of fuel wasted during idle, the report generator application 138 first identifies periods of time during the route where the vehicle 102 is idle. Using this determination, the report generator application 138 allocates fuel usage during those idle times to a fuel waste category. It should be noted that, while many examples herein relate to fuel waste, the amount of waste is not limited to fuel and may be applied to other routine maintenance items such as oil or powertrain wear.

For instance, the report generator application 138 may identify a vehicle 102 as being idle based on factors including geographic location, vehicle speed, and engine RPM. As one non-limiting example, if vehicle speed is zero (or below a predefined speed), and fuel consumption is greater than zero, then the vehicle 102 may be identified as being idle. Using the aggregated data 126, the report generator application 138 adds up the fuel usage during those idle times, and determines a fuel waste measure in terms of units of fuel used (e.g., gallons of fuel).

To provide a measure of the waste in terms of cost to a fleet operator, the report generator application 138 may determine a dollar cost of the waste for each vehicle 102. For instance, the report generator application 138 may multiply the fuel used during idle events by a dollar cost per unit of fuel (e.g., $4 per gallon of gasoline). In an example, the dollar cost may be predefined for various geographic areas such as metropolitan areas. In another example, the dollar cost may be entered by a user, or may be queried from the Internet using a service that provides local vehicle 102 fuel costs. The report generator application 138 may further rank the vehicles 102 in order from best to worst (or worst to best) fuel waste cost over the route.

The report server 142 may be another application included on the storage 132 of the remote server 128. The report server 142 may include an interface to the report generator application 138 that is accessible using a display device 144 in communication over the communication network 122 with the remote server 128. When accessed, the report server 142 may be configured to allow the user of the display device 144 to access, view, and interact with aspects of the information of the data reports 140. In an example, the report server 142 may be a web server configured to support query and display of data reports 140 over hypertext transfer protocol (HTTP). In another example, the report server 142 may be configured to support data reports 140 in a proprietary format via a thick client application (not shown) installed to the display device 144.

The display device 144 may include various devices usable by users to access the report server 142 provided by the remote server 128 over the communication network 122. As some examples, display devices 144 may include laptop computers, tablet or other handheld computers, mobile phones, computer workstations, servers, desktop computers, or some other computing system and/or device. Further aspects of the operation of the display device 144 to view data reports 140 is discussed in detail with respect to FIGS. 2-4. As another possibility, message delivery may be performed to the users themselves via the HMI of the vehicle 102. In one example, a chime effect may be provided in the vehicle 102 cabin or an indicator may be represented in the instrument panel when a message is available.

Figure 1B:
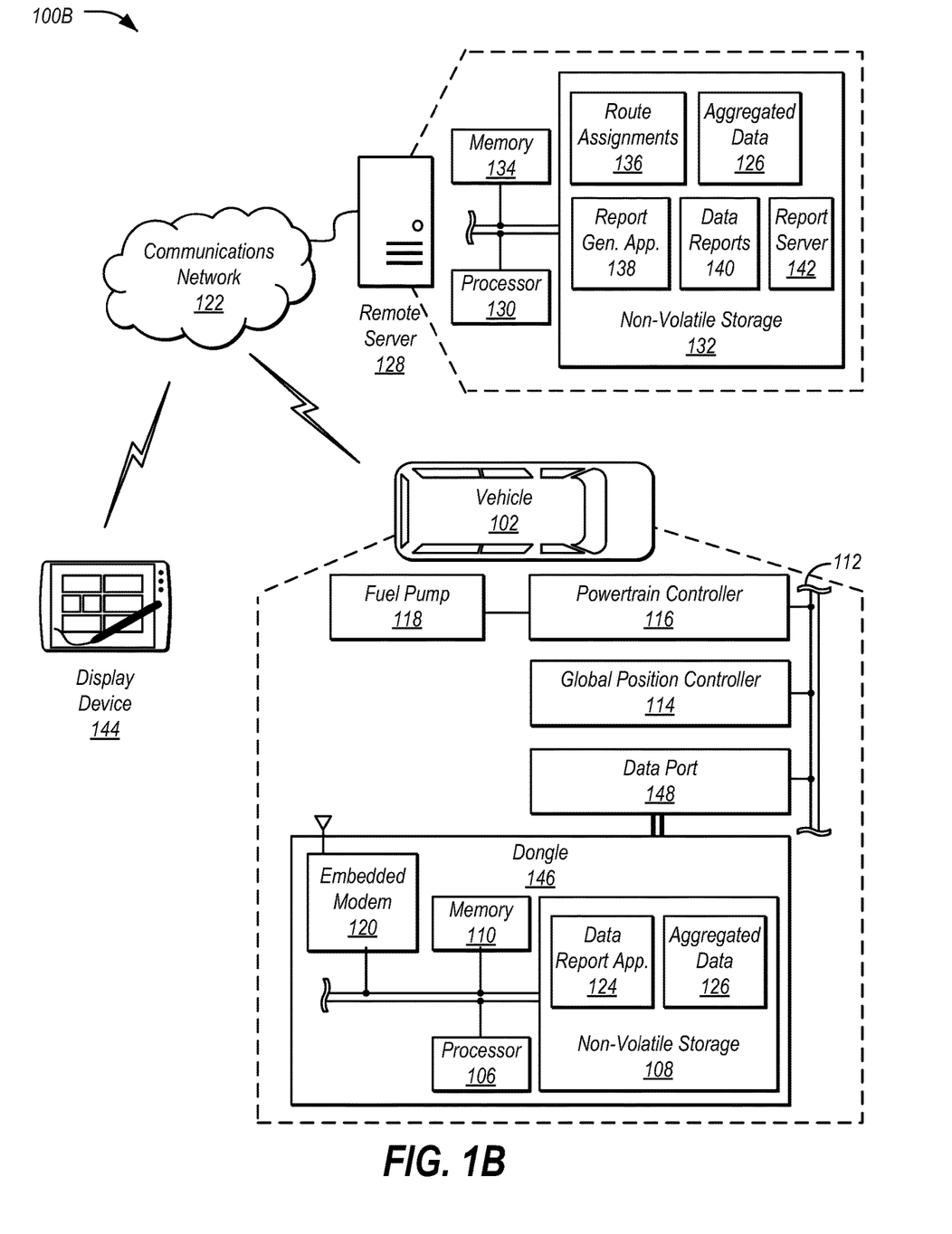
FIG. 1B illustrates an alternate example system for monitoring vehicle fuel usage over predefined routes to identify fuel waste cost.

FIG. 1B illustrates an alternate example system 100B for monitoring vehicle fuel usage over predefined routes to identify fuel waste cost. As compared to the system 100A, the system 100B includes a dongle 146 in communication with the vehicle bus 112 via a data port 148 (e.g., an OBD-II port). In the system 100B, the dongle 146 performs the data collection, aggregation, and transmission functions described as being performed by the telematics controller 104 in the system 100A.

Other variations on the systems 100A and 100B are possible. For instance, the operations described as being performed by the remote server 128 may be performed by multiple server devices. For instance, a data storage server may receive and maintain the aggregated data 126 and route assignments 136, while a data reporting server may execute the report generation application 138 and report server 142. In such an example, the data reporting server may query the data storage server for the relevant aggregated data 126 via a data interface or API exposed by the data storage server.

Figure 2:
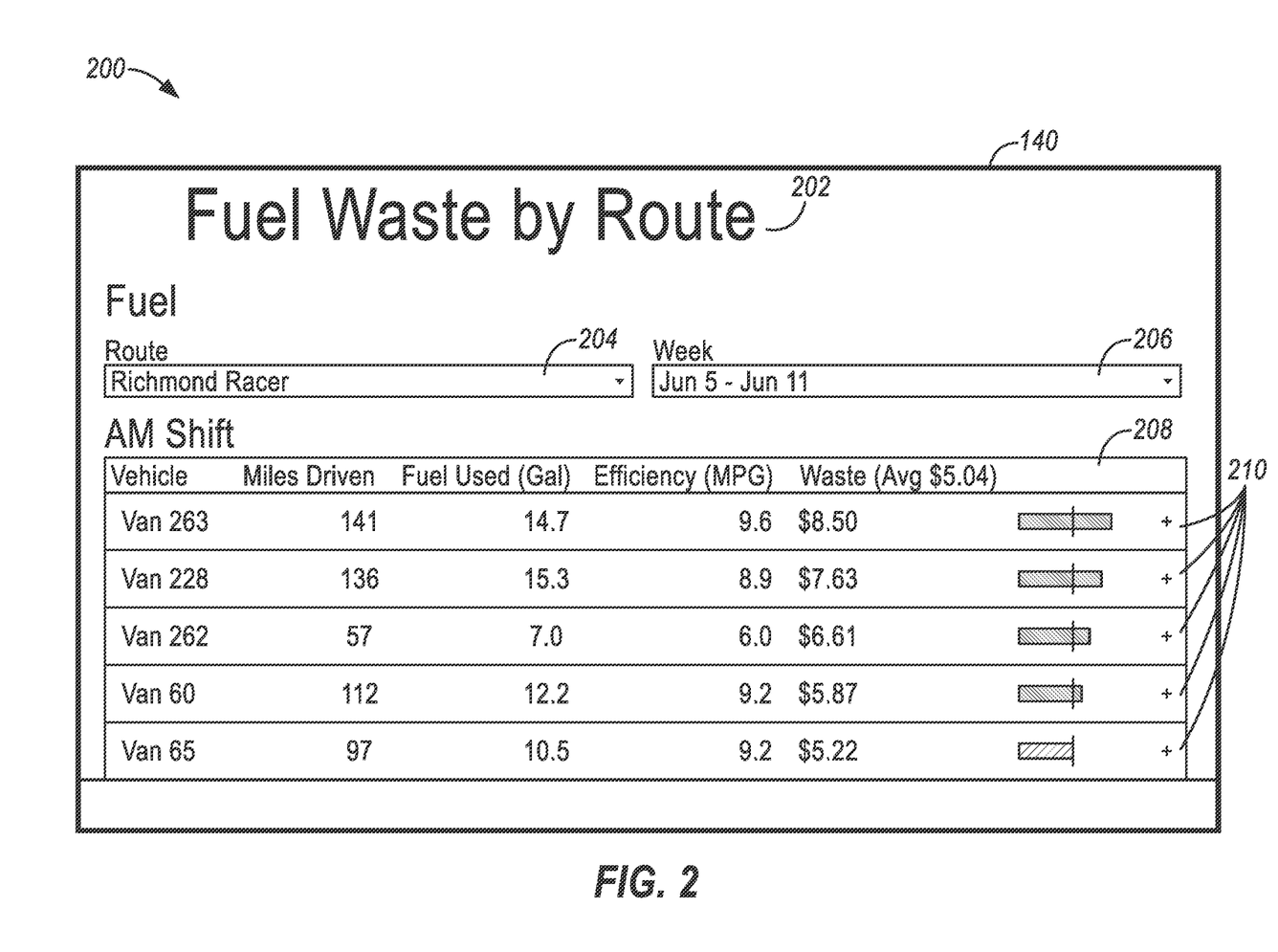
FIG. 2 illustrates an example of a data report for displaying fuel waste by route.

FIG. 2 illustrates an example 200 of a data report 140 for displaying fuel waste by route. In an example, the data report 140 may be displayed to a screen of the display device 144. The display device 144 may be in communication with the remote server 128 over the communications network 122.

As shown, the data report 140 includes a title 202 indicating that the displayed data report 140 relates to fuel waste by route. The data report 140 also includes controls from which report criteria may be selected. For instance, the data report 140 may include a route selection control 204 including a listing of routes for which reporting data may be displayed, as well as a timeframe control 206 for selection of a period of time for analyzing vehicles 102 traversing the chosen route. In one example, the routes may be selected from the route selection control 204 according to a name assigned to the route, and the period of time may be selected by week.

Based on the selected criteria, the data report 140 further includes a report details control 208. The report details control 208 may include a listing of each of the vehicles 102 having traversed the selected route over the selected timeframe, as well as details of the fuel efficiency of the vehicles 102. For instance, for each vehicle 102 the report details control 208 may include a name or other identifier of the vehicle 102 (e.g., "Van 123"), a distance traveled by the vehicle 102 (e.g., in miles), an amount of fuel used by the vehicle 102 in traversing the distance traveled (e.g., in gallons), and an efficiency of the vehicle 102 computed using the distance traveled and fuel used (e.g., in miles-per-gallon).

Additionally, the report details control 208 may further include details related to the fuel waste of the vehicles 102. For instance, for each vehicle 102 the report details control 208 may display a waste calculation in monetary units (e.g., dollars), as well as a graphical representation of the amount of waste as compared to an average amount of waste for the vehicles 102 in the data report 140. In one example, the graphical representation may include a bar illustrated in size in proportion to the amount of waste identified for the respective vehicle 102, along with an average waste indication placed at a location along the bar of the average vehicle 102 waste. Moreover, bars that exceed the average waste indication may be displayed in a first appearance (e.g., a color such as red, a first pattern, etc.), while bars that do not exceed the average waste indication may be displayed in a second appearance (e.g., a color such as yellow, a second pattern, etc.). The report details control 208 may further provide an indication of the monetary amount of the average waste, which in the illustrated example is shown in the label of the waste column.

As the period of time for the data report 140 may include multiple traversals of a route by a single vehicle 102, the data shown about each vehicle 102 may be an aggregation of data from multiple traversals of the selected route. The report details control 208 may further allow for the user to expand the information shown for a selected vehicle 102 to allow for the data report 140 to display the data regarding the individual routes. For instance, each vehicle 102 record may include an expansion control 210 that, when selected, causes the corresponding vehicle 102 record to be expanded.

As another example, data reporting may include providing tips to a fleet manager or driver as to what actions may be performed to improve fuel efficiency. In an example, poor fuel economy may be a result of excessive idling or may be due to poor powertrain operations that negatively affect fuel. As yet another example, tips may be provided regarding how to avoid idle events, such as by introducing ideas to improve an operations process or by providing proposed changes to a route.

Figure 3:
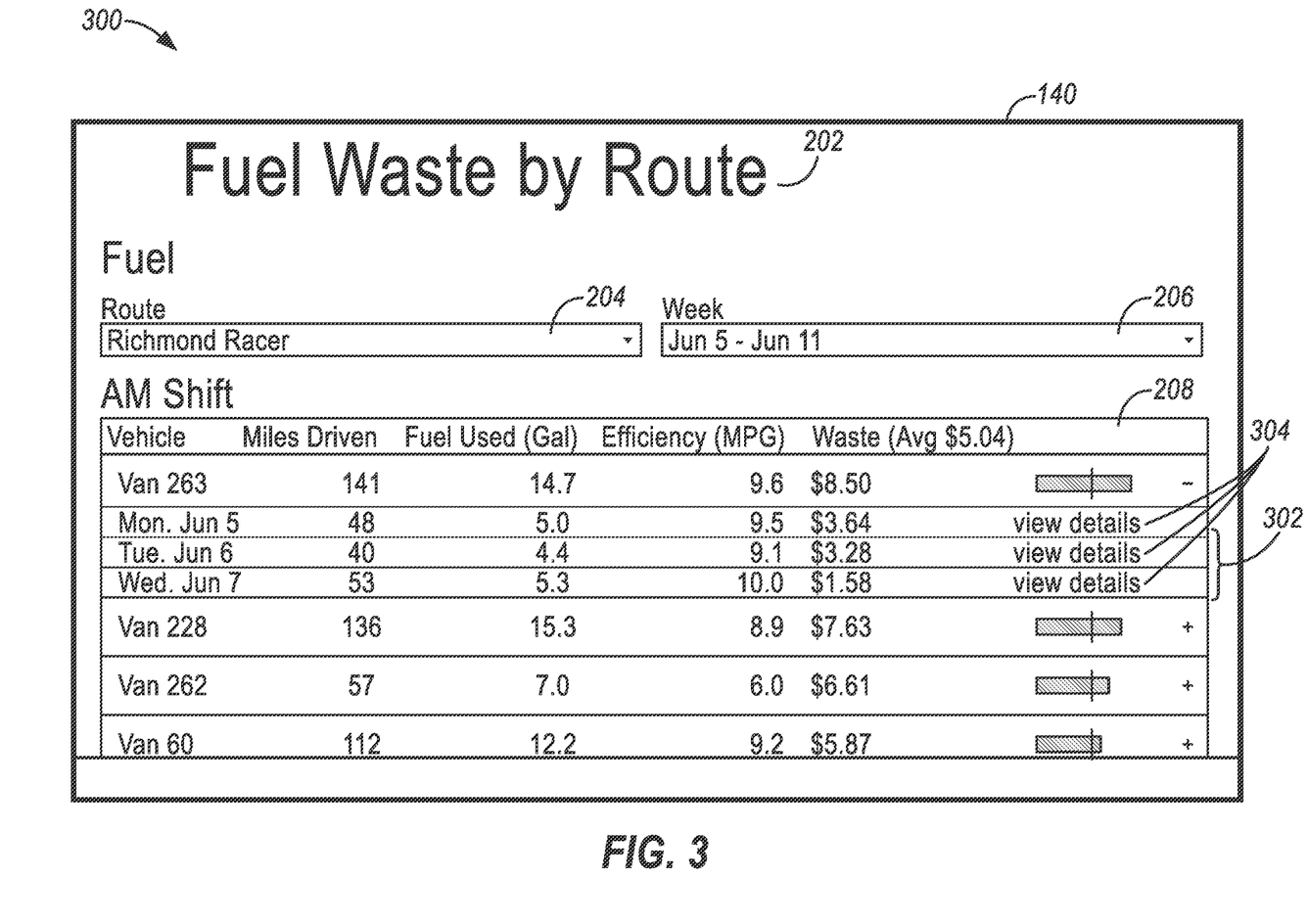
FIG. 3 illustrates an example of a data report for displaying fuel waste by route having expanded detail for a vehicle.

FIG. 3 illustrates an example 300 of a data report 140 for displaying fuel waste by route having expanded detail for a vehicle 102. The data report 140 in the example 300 may be presented responsive to user selection of the expansion control 210 of the "van 263" vehicle 102 in the example 200.

As shown, expanded data 302 regarding the multiple traversals of the selected route by the expanded vehicle 102 is provided in the report details control 208. These additional details include, for example, data for each traversal of the route incorporated into the overall vehicle 102 information. For each traversal, the expanded data 302 may include a timeframe of the traversal (e.g., a date and/or time), a distance traveled by the vehicle 102 (e.g., in miles), an amount of fuel used by the vehicle 102 in traversing the distance traveled (e.g., in gallons), an efficiency of the vehicle 102 computed using the distance traveled and fuel used (e.g., in miles-per-gallon), and a waste calculation in monetary units (e.g., dollars). It can be seen that although the efficiency may differ per traversal, the sum of the distance traveled, fuel used, and waste amount for each route adds up to the totals for each vehicle 102 overall.

The expanded data 302 may further allow for the user to view details of each vehicle 102 route traversal in the expanded information shown for the selected vehicle 102. For instance, each route in the expanded data 302 may include a details control 304 that, when selected, causes a details view to be displayed for the selected route traversal.

Figure 4:
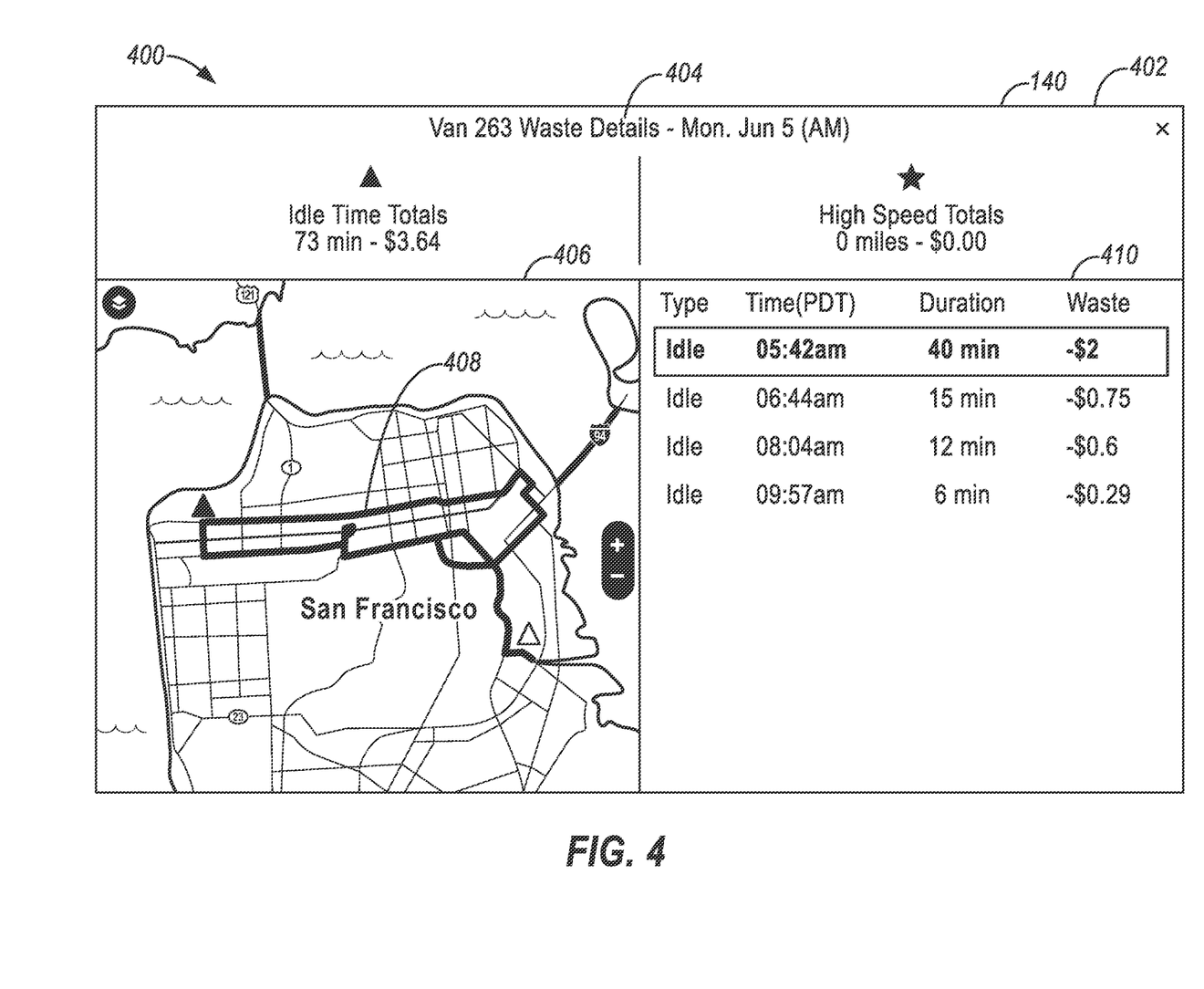
FIG. 4 illustrates an example of a data report for displaying details of a selected route traversal for a vehicle.

FIG. 4 illustrates an example 400 of a data report 140 for displaying details of a selected route traversal for a vehicle 102. The data report 140 in the example 400 may be presented responsive to user selection of the details control 304 of the "Mon. Jun. 5" route traversal in the example 300.

As shown, a details pane 402 includes further information regarding the selected route traversal. The details pane 402 may include a title 404 indicating the vehicle 102 and route time being displayed. In addition, the details pane 402 may include a map view 406 illustrating a path 408 of the vehicle 102 along the selected route. The details pane 402 may also include a waste events list 410 illustrating a listing of the events contributing to the waste calculation for the selected route. As shown, each waste event is specified according to a type (e.g., idle, over-speeding, etc.), a time of the event (e.g., a time at which the event began), a duration of the event (e.g., in minutes), and a value of the waste for the event (e.g., in dollars). As shown, four idle events contributed to the total waste value for the selected route traversed by the vehicle 102.

Figure 5:
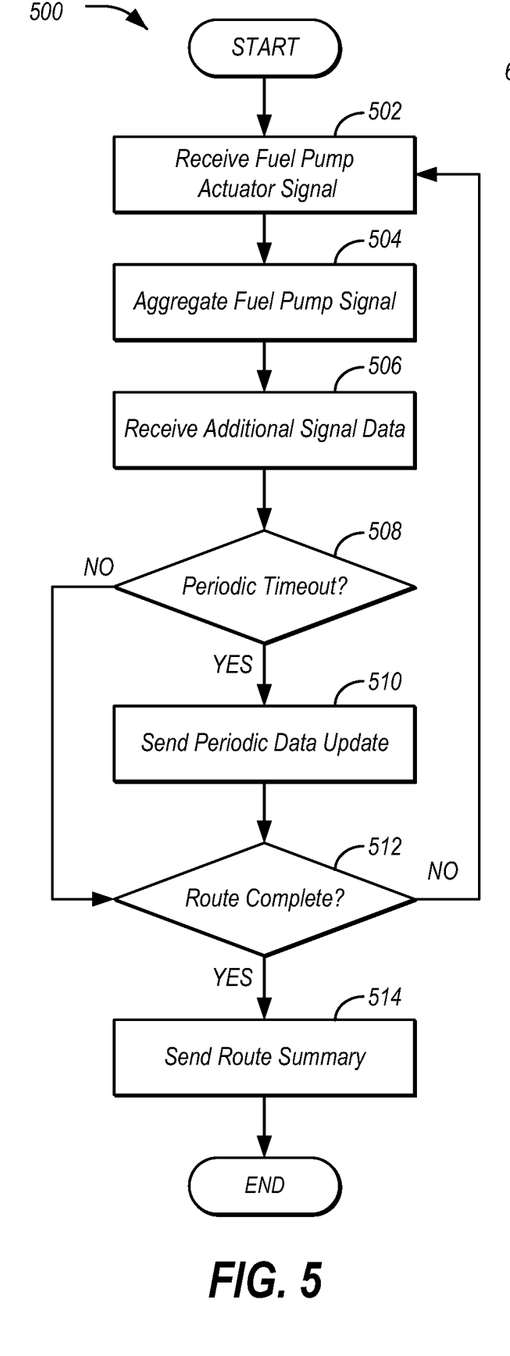
FIG. 5 illustrates an example process for sending aggregated data from a vehicle to a remote server.

FIG. 5 illustrates an example process 500 for sending aggregated data 126 from a vehicle 102 to a remote server 128. In an example, the process 500 may be performed by processors 106 of telematics controllers 104 and/or dongles 146 of vehicles 102 of a fleet. The process 500 may be initiated, for example, responsive to initiation of traversal of a route by the vehicle 102.

Route traversal may be initiated due to a user interaction, such as the user selecting that the route is begun from a user interface of the vehicle 102. In another example, the process 500 be initiated responsive to another action, such as the vehicle 102 leaving a predefined location marked as the start of the route, or the vehicle 102 being started at a predefined time corresponding to the route. In some examples, initiation of the route may be identified based on shifts, such that a route is deemed to be started at a predefined time at which a shift is scheduled to begin. Similarly, a route may be deemed to be completed at a scheduled time at which a route is intended to be completed. In other examples, a journey state parameter may be provided by the processor 106 that records when the vehicle 102 was turned on and off in the context of a trip. In yet a further example, geofencing may be used to deduce route start and end. In an example, a geofence may be defined for a start location of a route, and a second geofence may be defined for an end location of a route. When the vehicle 102 leaves the start location geofence the route may be deemed to be started, and when the vehicle 102 arrives at the end location geofence the route may be deemed to be concluded.

At operation 502, the processor 106 receives a fuel pump actuator signal. In an example, the powertrain controller 116 provides a PWM signal used to drive an actuator of the fuel pump 118 or information indicative of the PWM signal to the vehicle bus 112. The processor 106 may receive this data via the vehicle bus 112.

The processor 106 aggregates the fuel pump signal at 504. In an example, the processor 106 determine, from the fuel pump actuator signal, an amount of fuel that was used. The computation of the amount of fuel used may be determines according to an integration of the received PWM data.

At 506, the processor 106 receives additional signal data. In an example, the processor 106 receives vehicle location data over the vehicle bus 112 provided from the global position controller 114. In another example, the processor 106 receives other information captured from the vehicle bus 112, such as vehicle speed, engine speed, engine on/off status, and vehicle identifier (e.g., VIN).

At operation 508, the processor 106 determines whether a periodic timeout has expired. In an example, the processor 106 may maintain a counter that causes the vehicle 102 to periodically send aggregated data 126 to the remote server 128. The periodic timeout may be, as some possibilities, every minute, every five minute, or every hour. If the timer has expired, the timer is reset and control passes to operation 510. Otherwise, control passes to operation 512.

The processor 106 sends a data update of aggregated data 126 at 510. The data update may include the amount of fuel used as determined at operation 504, as well as the additional signal data captured at operation 506. The amount of fuel may be an accumulation of fuel used for the duration of the route, to allow for the remote server 128 to identify the total fuel used by the vehicle 102, regardless of whether one or more transmissions were lost.

At 512, the processor 106 determines whether a route is complete. Determining that the route is complete may be identified using one or more of the approaches mentioned above. In an example, the processor 106 may determine the route as being completed due to a user interaction, such as the user selecting that the route is complete from a user interface of the vehicle 102. In another example, the processor 106 may determine the route as being completed due to another action, such as the vehicle 102 reaching a predefined location marked as the end of the route, or the vehicle 102 reaching a location of the end of the route. If the route is complete, control passes to operation 514. Otherwise, control returns to operation 502.

At operation 514, the processor 106 sends a route summary. The route summary may include complete information for the route, such as the start time, end time, and total fuel consumption. After operation 514, the process 500 ends.

Figure 6:
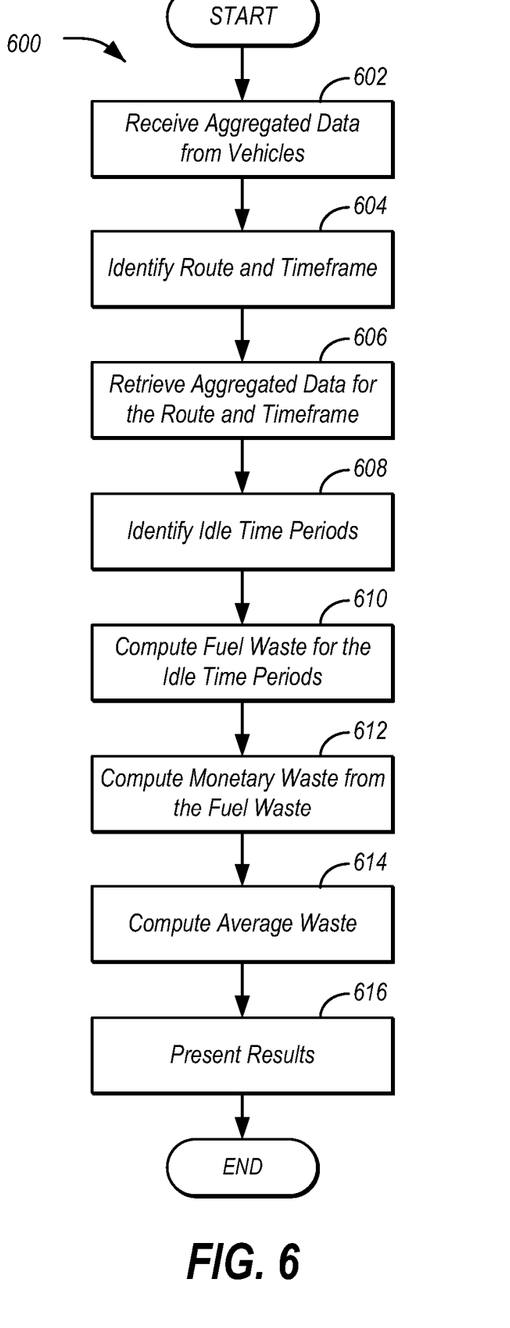
FIG. 6 illustrates an example process for displaying data reports of fuel waste by route according to the aggregated data.

FIG. 6 illustrates an example process 600 for displaying data reports 140 fuel waste by route according to the aggregated data 126. In an example, the process 600 may be performed by the remote server 128, responsive to communication from the display device 144.

At operation 602, the remote server 128 receives aggregated data 126 from vehicles 102 of a fleet. Further details of the receipt of aggregated data 126 are discussed above with respect to the process 500.

The remote server 128 identifies a route and a timeframe at 604. In an example, the remote server 128 receives selection of a route and a timeframe from the display device 144. For instance, this selection may be performed at the display device 144 via the route selection control 204 and timeframe control 206, where responsive to the selection the display device 144 may send a message over the communications network to the remote server 128 indicating the selections.

At 606, the remote server 128 retrieves aggregated data 126 corresponding to the identified route and timeframe. In an example, the aggregated data 126 may be indexed by the remote server 128 according to route assignments 136 and timeframe, and the remote server 128 may query the requested data based on the selections received at operation 602.

At operation 608, the remote server 128 identifies idle time periods. In an example, the remote server 128 may analyze the aggregated data 126 received at operation 604 to identify periods of idle time. In an example, the remote server 128 may identify a vehicle 102 as being idle based on factors including geographic location, vehicle speed, and engine RPM. As one non-limiting example, if vehicle speed is zero (or below a predefined speed), and engine RPM is non-zero, then the vehicle 102 may be identified as being idle.

The remote server 128 computes fuel waste for the idle time periods at 610. In an example, using the fuel usage information in the aggregated data 126, the remote server 128 adds up the fuel usage during those idle times, and determined a fuel waste measure in terms of units of fuel used (e.g., gallons of fuel).

At 612, the remote server 128 computes monetary waste from the fuel waste. In an example, the remote server 128 may multiply the fuel used during idle events by a dollar cost per unit of fuel (e.g., $4 per gallon of gasoline). In an example, the dollar cost may be predefined for various geographic areas such as metropolitan areas. In another example, the remote server 128 may receive the dollar cost from the user (e.g., via the display device 144), or may queried the information from the Internet according to location information for the route using a service that provides local vehicle 102 fuel costs.

At operation 614, the remote server 128 computes average waste. In an example, the remote server 128 may identify for the route being displayed, an average of the waste numbers computed at operation 610. This measure may be used to provide an indication of how well an individual vehicle 102 is performing compared to other vehicles 102 traversing the same route.

The remote server 128 presents the results at 616. Example presentations of the results are discussed in detail above with respect to the examples 200, 300 and 400. After operation 616, the process 600 ends.

Computing devices described herein, such as the telematics controller 104, global position controller 114, powertrain controller 116, remote server 128, display device 144, and dongle 146, generally include computer-executable instructions where the instructions may be executable by one or more computing devices such as those listed above. Computer-executable instructions, such as those of the data reporting application 124, report generator application 138, and report server 142, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, such as the processes 500 and 600, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
 a remote server;
 a powertrain controller of a vehicle configured to provide a fuel pump actuator signal indicative of fuel flow to a vehicle bus; and
 a processor of the vehicle configured to receive data from the vehicle bus, programmed to
  perform an integration of the actuator signal to accumulate fuel usage of the vehicle, and
  periodically send the accumulated fuel usage, vehicle speed, engine speed, engine status, and vehicle location to the remote server;
 a memory of the remote server storing accumulated fuel usage for vehicles of a fleet compiled from fuel pump actuator signals, each of the vehicles including a powertrain controller configured to provide a respective fuel pump actuator signal indicative of fuel flow within the respective vehicle, and a processor programmed to perform an integration of the actuator signal to accumulate fuel usage of the vehicle, and periodically send the accumulated fuel usage, vehicle speed, engine speed, engine status, and vehicle location to a server, the fleet including the vehicle; and
 a processor of the remote server programmed to
  retrieve a subset of accumulated fuel usage for a set of the vehicles traversing a route during a timeframe,
  compute fuel waste for identified idle time periods within the accumulated fuel usage,
  compute monetary waste from the fuel waste, and
  generate a report including the monetary waste.

2. The system of claim 1, wherein the fuel pump actuator signal is a pulse-width modulated (PWM) signal generated by the powertrain controller to drive a fuel pump.

3. The system of claim 1, further comprising a global position controller configured to provide information indicative of the vehicle location to the vehicle bus, wherein the processor is programmed to retrieve the vehicle location from the vehicle bus.

4. The system of claim 1, further comprising a data port configured to provide access to the vehicle bus, wherein the processor is included in a dongle connected to the data port.

5. The system of claim 1, further comprising a telematics controller in communication with the vehicle bus, wherein the processor is included in the telematics controller.

6. The system of claim 1, wherein the engine status indicates whether the engine is on or off.

7. The system of claim 1, wherein the processor of the remote server is further programmed to:
   compute an average monetary waste for the vehicles traversing the route during the timeframe, and
   include the average monetary waste in the report.

8. The system of claim 1, wherein the processor of the remote server is further programmed to include, in the report for each vehicle in the set of the vehicles, a graphical representation sized in proportion to an amount of the monetary waste identified for the respective vehicle, with an indication of the average monetary waste placed at a location along the graphical representation to indicate the waste of an average vehicle.

9. The system of claim 1, wherein the processor of the remote server is further programmed to periodically receive the accumulated fuel usage data from the vehicles in the set of the vehicles.

10. The system of claim 1, wherein the monetary waste is computed according to a local fuel cost for an area of operation of the fleet.

11. The system of claim 1, wherein the processor of the remote server is further programmed to, responsive to receipt of a selection to expand data for one of the vehicles in the set of the vehicles, expand the data for the vehicle to show details for each traversal of the route performed by the vehicle within the timeframe.

12. A method comprising:
   providing, by a powertrain controller of a vehicle, a fuel pump actuator signal indicative of fuel flow to a vehicle bus;
   receiving data from the vehicle bus by a processor of the vehicle;
   performing an integration of the actuator signal to accumulate fuel usage of the vehicle;
   periodically sending the accumulated fuel usage, vehicle speed, engine speed, engine status, and vehicle location to a remote server;
   retrieving, by the remote server, a subset of accumulated fuel usage for a set of vehicles of a fleet traversing a route during a timeframe, the fleet including the vehicle, the accumulated fuel usage compiled from fuel pump actuator signals indicative of fuel flow within the set of vehicles, each of the vehicles including a powertrain controller configured to provide a respective fuel pump actuator signal indicative of fuel flow within the respective vehicle, and a processor programmed to perform an integration of the actuator signal to accumulate fuel usage of the vehicle, and periodically send the accumulated fuel usage, vehicle speed, engine speed, engine status, and vehicle location to the remote server;
   computing fuel waste for identified idle time periods within the accumulated fuel usage;
   computing monetary waste from the fuel waste; and
   generating a report including the monetary waste.

13. The method of claim 12, further comprising
   computing an average monetary waste for the vehicles traversing the route during the timeframe, and
   including the average monetary waste in the report.

14. The method of claim 12, further comprising including, in the report for each vehicle in the set of the vehicles, a graphical representation sized in proportion to an amount of the monetary waste identified for the respective vehicle, with an indication of the average monetary waste placed at a location along the graphical representation to indicate the waste of an average vehicle.

15. The method of claim 12, further comprising periodically receiving the accumulated fuel usage data from the vehicles in the set of the vehicles.

16. The method of claim 12, further comprising computing the monetary waste according to a local fuel cost for an area of operation of the fleet.

17. The method of claim 12, further comprising, responsive to receipt of a selection to expand data for one of the vehicles in the set of the vehicles, expanding the data for the vehicle to show details for each traversal of the route performed by the vehicle within the timeframe.

18. The method of claim 12, further comprising sending the report over a communications network to a display device for viewing.

\* \* \* \* \*